WILLIAM G. COMSTOCK, OF EAST HARTFORD, CONNECTICUT.

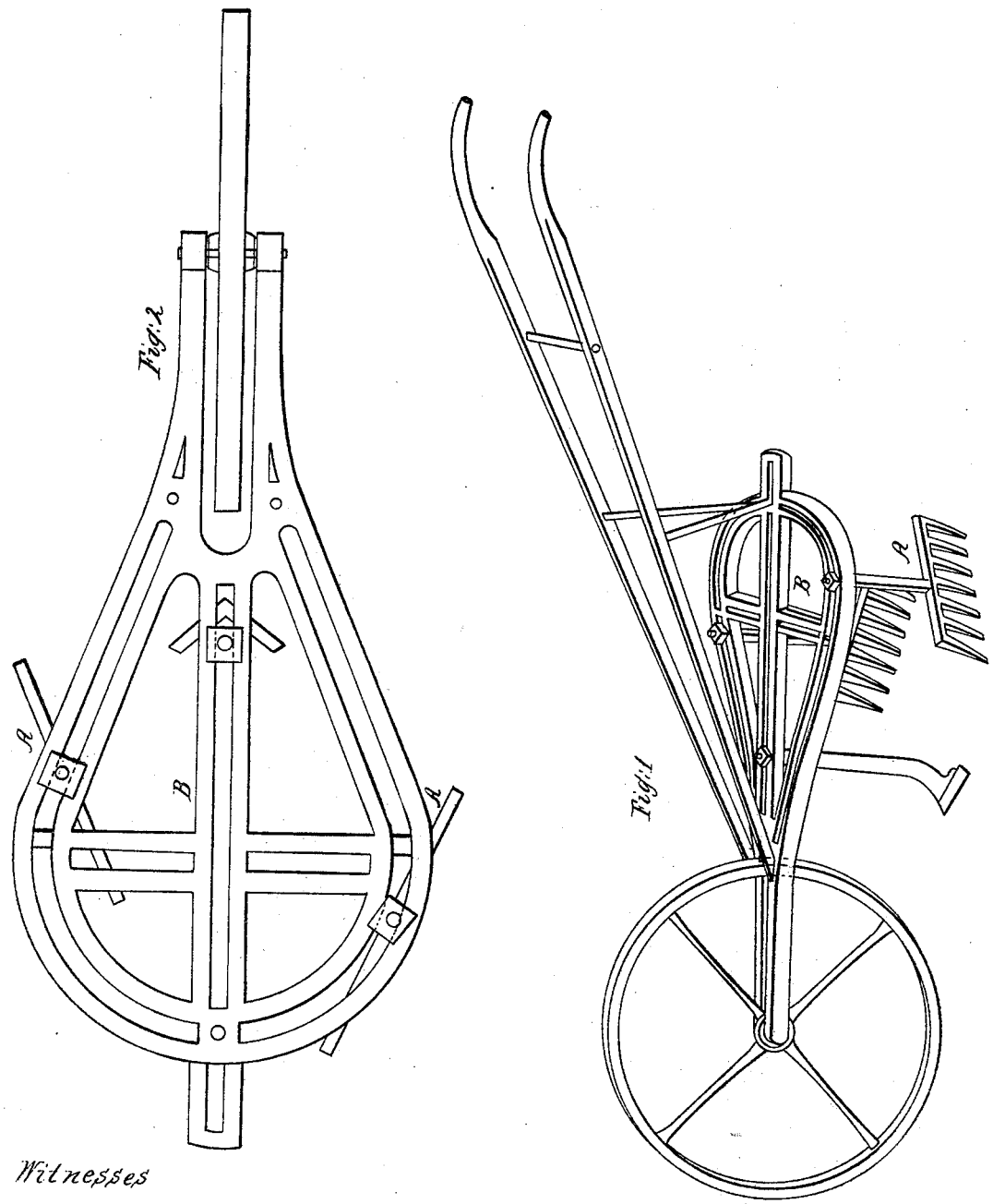

Letters Patent No. 90,639, dated June 1, 1869.

IMPROVEMENT IN HAND-CULTIVATOR AND WEEDER.

The Schedule referred to in these Letters Patent and making part of the same.

*To all whom it may concern:*

Be it known that I, WILLIAM G. COMSTOCK, of East Hartford, in the county of Hartford, and State of Connecticut, have invented a new and useful Implement for Weeding and Hand-Cultivating Plants in Drills; and I do hereby declare that the following is a full, clear, and exact description of the construction and application of the same, reference being had to the annexed drawings, making a part of this specification, in which—

Figure 1 is a perspective view, and

Figure 2, a longitudinal elevation.

To enable others skilled in the art to make and use my invention, I will proceed to describe its construction and application.

I construct my implement in the form of an ordinary cultivator, with a wheel in front, and with handles projecting in the rear, by which it is pushed or shoved forward by the operator, in the act of weeding and cultivating. But I make the frame of cast-iron, with stationary arms, which are bent around to meet in the rear, with slits running nearly the whole length, and also slits in the middle, and cross-bars to admit of the rakes, hoes, or cultivator-teeth being placed and held by a nut in the best position to accomplish the work desired.

This cultivator-frame is shown at B, and the rakes are shown at A, in the accompanying drawings.

In the place of outside cultivator-teeth, I use one or two rakes, which are bent forward sufficiently to enter the ground easily.

The rakes are designed to be adjusted to work close to the drills, at such an inclination as will eradicate the weeds without throwing the earth upon the plants, by turning on the shank, and are held in place by a nut, as shown in the drawings.

The rakes are also designed to be placed in position in the cultivator-frame for throwing the earth to or from the plants, for opening drills, covering seeds, and for raking, and may be used alone, or with hoes or cultivator-teeth of any of the different forms.

Claim.

What I claim as my invention, is—

The combination and arrangement of the slotted frame B and adjustable rakes A, all as constructed, and operated as described.

WILLIAM G. COMSTOCK.

Witnesses:
 FRED. O. COMSTOCK,
 JABEZ K. COMSTOCK.